United States Patent
Wang et al.

(10) Patent No.: US 10,921,636 B2
(45) Date of Patent: Feb. 16, 2021

(54) DISPLAY PANEL AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Jingyu Wang, Beijing (CN); Jingyong Hu, Beijing (CN); Haigang Yang, Beijing (CN); Yang Li, Beijing (CN); Jungho Park, Beijing (CN); Zhidan Sun, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/533,584

(22) Filed: Aug. 6, 2019

(65) Prior Publication Data

US 2020/0285103 A1    Sep. 10, 2020

(30) Foreign Application Priority Data

Mar. 5, 2019    (CN) .......................... 2019 1 0164762

(51) Int. Cl.
*G02F 1/1343*    (2006.01)
*G02F 1/1335*    (2006.01)

(52) U.S. Cl.
CPC .. *G02F 1/133514* (2013.01); *G02F 1/134309* (2013.01); *G02F 2001/134345* (2013.01)

(58) Field of Classification Search
CPC ......... G02F 1/133514; G02F 1/134363; G02F 2001/134345
See application file for complete search history.

(56) References Cited

U.S. PATENT DOCUMENTS

| | | | | |
|---|---|---|---|---|
| 2010/0134728 A1* | 6/2010 | Kim | .................. | G02F 1/134363 349/106 |
| 2014/0211143 A1* | 7/2014 | Yuan | .................. | G02F 1/133707 349/143 |
| 2016/0342049 A1* | 11/2016 | Zhan | .................. | G02F 1/133512 |
| 2016/0370661 A1* | 12/2016 | Ono | .................. | G02F 1/134309 |
| 2018/0356700 A1* | 12/2018 | Hao | .................. | G02F 1/136286 |

* cited by examiner

*Primary Examiner* — Thanh Nhan P Nguyen
(74) *Attorney, Agent, or Firm* — Kinney & Lange, P.A.

(57) ABSTRACT

A display panel and a display device are disclosed. The display panel includes: a first color pixel including: a first sub-electrode disposed in a first region of the first color pixel and configured to extend in a first direction; and a second sub-electrode disposed in a second region of the first color pixel and configured to extend in a second direction, a second color pixel including a second electrode configured to extend in a third direction; and a third color pixel including a third electrode configured to extend in a fourth direction.

18 Claims, 5 Drawing Sheets

DISPLAY PANEL AND DISPLAY DEVICE

CROSS-REFERENCE TO RELATED APPLICATION

This application claims the benefit of Chinese Patent Application No. 201910164762.8 filed on Mar. 5, 2019 in the State Intellectual Property Office of China, the whole disclosure of which is incorporated herein by reference.

TECHNICAL FIELD

The present disclosure relates to the field of display technologies, and in particular to a display panel and a display device.

BACKGROUND

Liquid crystal display (LCD) has advantages of low radiation, small size, low energy consumption and the like, and is widely used in electronic products such as tablet computers, televisions or mobile phones.

SUMMARY

Some embodiments of the present disclosure provide a display panel comprising: a first color pixel comprising: a first sub-electrode disposed in a first region of the first color pixel and configured to extend in a first direction; and a second sub-electrode disposed in a second region of the first color pixel and configured to extend in a second direction, a second color pixel comprising a second electrode configured to extend in a third direction; and a third color pixel comprising a third electrode configured to extend in a fourth direction.

In some embodiments, the first color pixel further comprises a first color resist covering the first sub-electrode and the second sub-electrode; the second color pixel further comprises a second color resist covering the second electrode; and the third color pixel further comprises a third color resist covering the third electrode, a transmittance of the second color resist and a transmittance of the third color resist are both smaller than a transmittance of the first color resist.

In some embodiments, the first color pixel, the second color pixel and the third color pixel are arranged in an array, in a pixel row direction, the first color pixel, the second color pixel, and the third color pixel are sequentially and periodically arranged.

In some embodiments, the first direction and the second direction are mirror-symmetrical to each other with respect to the pixel row direction.

In some embodiments, the third direction and the fourth direction are mirror-symmetrical to each other with respect to the pixel row direction.

In some embodiments, a ratio of each of the transmittance of the second color resist and the transmittance of the third color resist to the transmittance of the first color resist is less than 1 and greater than or equal to 0.95.

In some embodiments, a thickness of the first color resist is smaller than a thickness of the second color resist, and the thickness of the first color resist is smaller than a thickness of the third color resist.

In some embodiments, the thickness of the second color resist is equal to the thickness of the third color resist.

In some embodiments, the first direction is parallel to the third direction; and/or the second direction is parallel to the fourth direction.

In some embodiments, an acute angle between the pixel row direction and each of the first direction, the second direction, the third direction and the fourth direction is in a range of 2° to 20°.

In some embodiments, an acute angle between the pixel row direction and each of the first direction, the second direction, the third direction and the fourth direction is about 5° or 7°.

In some embodiments, the first color pixel is a blue pixel, the second color pixel is a green pixel, and the third color pixel is a red pixel.

In some embodiments, each of the first sub-electrode, the second sub-electrode, the second electrode and the third electrode is a pixel electrode or a common electrode.

In some embodiments, the display panel further comprising a fourth color pixel, wherein the first color pixel, the second color pixel, the third color pixel, and the fourth color pixel are arranged in an array, in a pixel row direction, the first color pixel, the second color pixel, the third color pixel and the fourth color pixel are sequentially and periodically arranged, wherein in each pixel row, one of any two adjacent fourth color pixels comprises a fourth electrode extending in a fifth direction, and the other comprises a fifth electrode extending in a sixth direction.

In some embodiments, the fifth direction and the sixth direction are mirror-symmetrical to each other with respect to the pixel row direction.

In some embodiments, the fifth direction is parallel to the first direction; and/or the sixth direction is parallel to the second direction.

In some embodiments, the fifth direction is parallel to the third direction; and/or the sixth direction is parallel to the fourth direction.

In some embodiments, the fourth color pixel is a white pixel.

In some embodiments, the display panel comprises a liquid crystal display panel.

Some embodiments of the present disclosure provide a display device comprising the display panel according to the above embodiments.

BRIEF DESCRIPTION OF THE DRAWINGS

In order to more clearly explain the technical solutions in the embodiments of the present disclosure or the related art, the drawings to be used in the embodiments or the related art description will be briefly described below. Obviously, the drawings in the following description merely correspond to some of embodiments of the present disclosure, and those skilled in the art can obtain other drawings according to the drawings without any inventive work.

DETAILED DESCRIPTION OF EMBODIMENTS

The technical solutions in the embodiments of the present disclosure are clearly and completely described below in conjunction with the accompanying drawings in the embodiments of the present disclosure. It is obvious that the described embodiments are only a part of the embodiments of the present disclosure, and not all of the embodiments. All other embodiments obtained by those skilled in the art based on the embodiments of the present disclosure without creative efforts are within the protective scope of the present disclosure.

Figure 1:
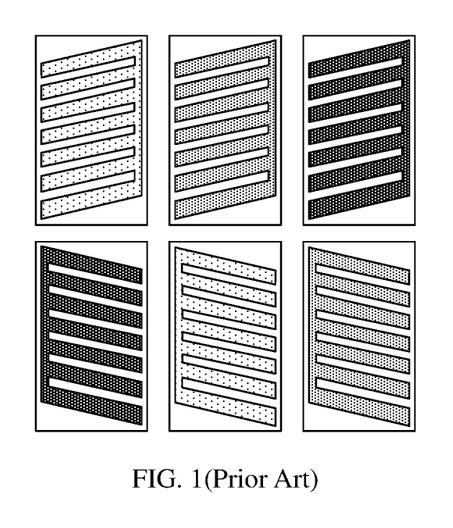
FIG. 1 is a schematic view of a pixel structure provided by the related art, in which an electrode of each pixel is mainly shown.

In the related art, in order to solve a color cast problem of a liquid crystal display, a pixel structure of two pixels two domains (2P2D) as shown in FIG. 1 may be employed. For example, an electrode of a pixel in an odd row and an electrode of a pixel in an even row both include strip electrodes, and extend in different directions. For the sake of clarity, FIG. 1 mainly shows an electrode structure of respective pixels.

However, even if an acute angle between an extending direction of the electrode of the pixel in the odd row and a pixel row direction is the same as an acute angle between an extending direction of the electrode of the pixel in the even row, the liquid crystal corresponding to the odd pixel row and liquid crystal corresponding to the even pixel row may have different deflection angles, thereby causing different liquid crystal light efficiencies, and the liquid crystal display displays image with bright and dark horizontal/vertical stripes.

Some embodiments of the present disclosure provide a display panel including a first color pixel, a second color pixel, and a third color pixel. The first color pixel includes a first electrode, and the first electrode includes a first sub-electrode disposed in a first region of the first color pixel and a second sub-electrode disposed in a second region of the first color pixel, the first sub-electrode extends in a first direction and the second sub-electrode extends in the second direction. The second color pixel includes a second electrode configured to extend in a third direction. The third color pixel includes a third electrode configured to extend in a fourth direction. Therefore, it is possible to avoid bright and dark horizontal/vertical stripes and the color cast problem of the display panel.

Figure 2:
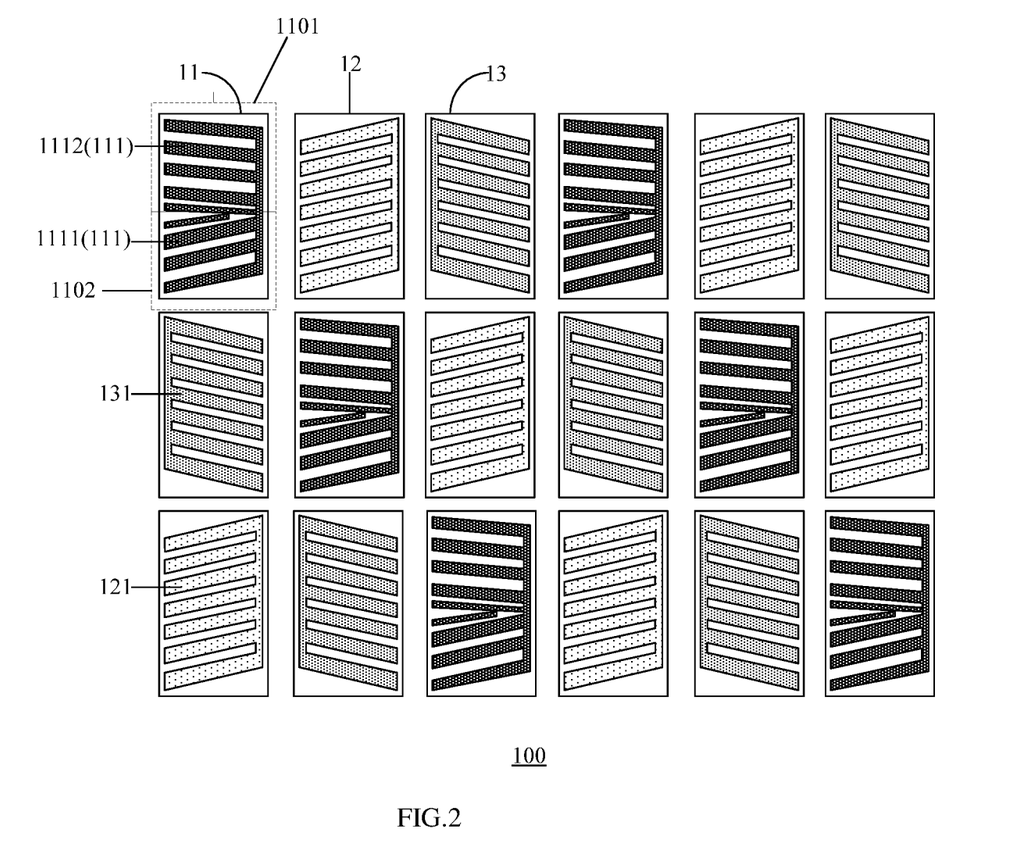
FIG. 2 is a schematic view of a pixel structure according to some embodiments of the present disclosure, in which an electrode of each pixel is mainly shown.

Some embodiments of the present disclosure provide a display panel 100. FIG. 2 is a schematic view of a pixel structure according to some embodiments of the present disclosure, in which an electrode of each pixel is mainly shown. As shown in FIG. 2, the display panel 100 includes a plurality of pixels arranged in an array, each pixel row includes a first color pixel 11, a second color pixel 12, and a third color pixel 13 that are sequentially and periodically arranged. The first color, the second color, and the third color are, for example, three primary colors. The first color pixel 11, the second color pixel 12, and the third color pixel 13 respectively include a first electrode 111, a second electrode 121, and a third electrode 131. In some embodiments, the first electrode 111, the second electrode 121, and the third electrode 113 all include, for example, strip electrodes. In any one pixel, a plurality of strip electrodes are electrically connected to each other, for example, by a longitudinal electrode parallel to a pixel column direction as shown in FIG. 2. In some embodiments, the first color pixel 11, the second color pixel 12, and the third color pixel 13 are also sequentially and periodically arranged in each pixel column.

The first color pixel 11 includes a first region 1101 and a second region 1102. For example, as shown in FIG. 2, the first region 1101 and the second region 1102 are arranged in the pixel column direction and are adjacent to each other. The first electrode 111 includes a first sub-electrode 1111 disposed in the first region 1101 and a second sub-electrode 1112 disposed in the second region 1102. The first sub-electrode 1111 extends in a first direction, and the second sub-electrode 1112 extends in a second direction. The first direction and the second direction are not parallel to the pixel row direction, that is, the first direction and the second direction are both inclined with respect to the pixel row direction. As a result, the first color pixel 11 includes two domains. In some embodiments, the first direction and the second direction may be mirror-symmetrical to each other with respect to the pixel row direction.

In the second color pixel 12, the second electrode 121 extends in a third direction, and the third direction is not parallel to the pixel row direction, that is, the third direction is inclined with respect to the pixel row direction; in the third color pixel 13, the third electrode 131 extends a fourth direction, and the fourth direction is not parallel to the pixel row direction, that is, the fourth direction is inclined with respect to the pixel row direction. In some embodiments, the third direction and the fourth direction may be mirror-symmetrical to each other with respect to the pixel row direction.

Figure 3:
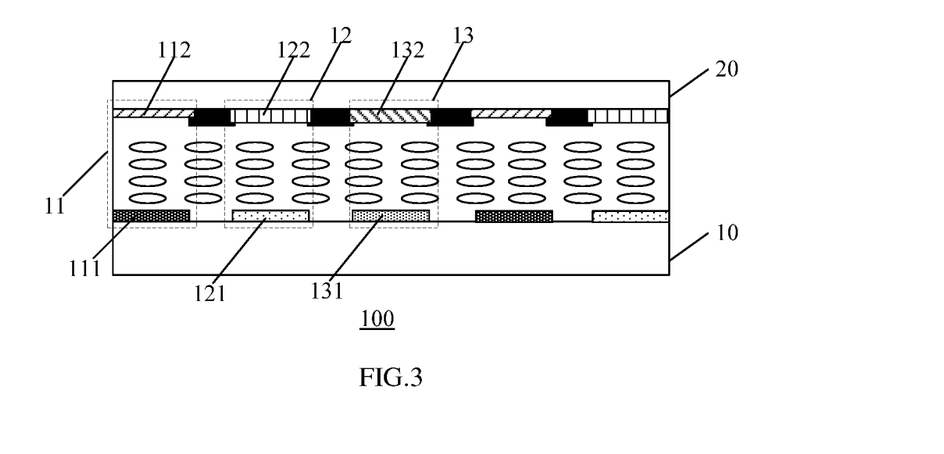
FIG. 3 is a schematic structural view of a display panel according to some embodiments of the present disclosure.

FIG. 3 is a schematic structural view of a display panel according to some embodiments of the present disclosure. As shown in FIG. 3, the display panel 100 includes a first substrate 10 and a second substrate 20 disposed opposite to each other, and a liquid crystal layer disposed between the first substrate 10 and the second substrate 20. The first color pixel 11 further includes a first color resist 112, the second color pixel 12 further includes a second color resist 122, and the third color pixel 13 further includes a third color resist 132. The first electrode 111, the second electrode 121, and the third electrode 131 are disposed on a side of the first substrate 10 facing the liquid crystal layer, and the first color resist 112, the second color resist 122, and the third color resist 132 are disposed on a side of the second substrate 20 facing the liquid crystal layer. In the first color pixel 11, the first color resist 112 covers the first electrode 111, that is, an orthographic projection of the first electrode 111 on the first substrate 10 falls within an orthographic projection of the first color resist 112 on the first substrate 10. In the second color pixel 12, the second color resist 122 covers the second electrode 121, that is, an orthographic projection of the second electrode 121 on the first substrate 10 falls within an orthographic projection of the second color resist 122 on the first substrate 10. In the third color pixel 13, the third color resist 132 covers the third electrode 131, that is, an orthographic projection of the third electrode 131 on the first substrate 10 falls within an orthographic projection of the third color resist 132 on the first substrate 10. In some embodiments, a transmittance of the second color resist 122 and a transmittance of the third color resist 132 are both smaller than a transmittance of the first color resist 112.

It should be noted that the first color, the second color, and the third color are not limited in the embodiments of the present disclosure. For example, the first color, the second color, and the third color are three primary colors. As an example, the first color, the second color, and the third color are red, green, and blue, respectively; or, the first color, the second color, and the third color are yellow, cyan, and magenta, respectively.

In some embodiments of the present disclosure, the first color pixel 11, the second color pixel 12, and the third color pixel 13 each include a pixel electrode and a common electrode. The first electrode 111, the second electrode 121, and the third electrode 131 may be pixel electrodes; or the first electrode 111, the second electrode 121, and the third electrode 131 may be common electrodes.

Here, when a large-size display panel is made, the first electrode 111, the second electrode 121, and the third electrode 131 are generally pixel electrodes; when a small-sized display panel is made, the first electrode 111, the second electrode 121, and the third electrode 131 are generally common electrodes. The present disclosure does not limit this.

The embodiments of the present disclosure do not limit title angles of the first sub-electrode 1111 and the second sub-electrode 1112. That is, an acute angle between the first direction and the pixel row direction (i.e. a horizontal direction in FIG. 2) may be of an arbitrary degree, and an acute angle between the second direction and the pixel row direction is of an arbitrary degree. In some embodiments, as long as the first direction and the second direction are mirror-symmetrical to each other with respect to the pixel row direction, and the normal display of the display panel is not adversely affected.

Some embodiments of the present disclosure do not limit a tilt angle of the second electrode 121, nor do they limit a tilt angle of the third electrode 131. That is, an acute angle between the third direction and the pixel row direction (i.e. a horizontal direction in FIG. 2) may be of an arbitrary degree, and an acute angle between the fourth direction and the pixel row direction is of an arbitrary degree. In some embodiments, as long as the third direction and the fourth direction are mirror-symmetrical to each other with respect to the pixel row direction, and the normal display of the display panel is not adversely affected.

In some embodiments of the present disclosure, the first direction is parallel to the third direction, and the second direction is parallel to the fourth direction; alternatively, the first direction is not parallel to the third direction, and the second direction is not parallel to the fourth direction.

Figure 4:
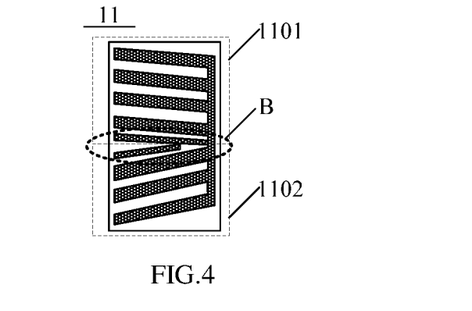
FIG. 4 is a schematic structural view of a first color pixel according to some embodiments of the present disclosure, in which an electrode of the first color pixel is mainly shown.

FIG. 4 is a schematic structural view of a first color pixel according to some embodiments of the present disclosure, in which an electrode of the first color pixel is mainly shown. As shown in FIG. 4, the first color pixel 11 is one pixel two domains (1P2D) structure, that is, in one domain (i.e. the first region 1101) of the first color pixel 11, the first sub-electrode 1111 extends in the first direction, and the first direction is inclined with respect to the pixel row direction; in the other domain (i.e. the second region 1102), the second sub-electrode 1112 extends in the second direction, and the second direction is inclined with respect to the pixel row direction. The first direction and the second direction are mirror-symmetrical to each other with respect to the pixel row direction. Since the electric field distribution is disordered at a position B where the first region 1101 and the second region 1102 are in abutment, the liquid crystal cannot be properly arranged, thereby forming an optical dark region therein. As a result, in the pixel structure of 1P2D, an overall light transmittance (also referred to as a liquid crystal light efficiency) of the first color pixel 11 is smaller than that of the second color pixel 12 and also smaller than that of the third color pixel 13.

As shown in FIG. 2, since a pixel structure of the second color pixel 12 is similar to that of the third color pixel 13, the liquid crystal light efficiency of the second color pixel 12 and the liquid crystal light efficiency of the third color pixel 13 are basically the same.

Figure 5:
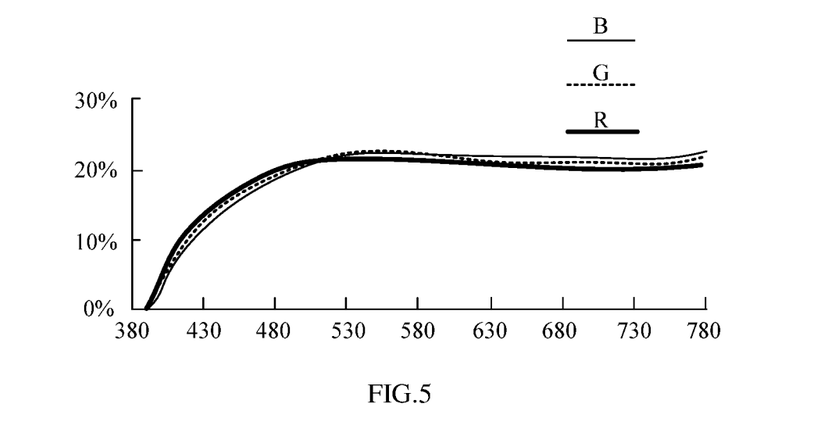
FIG. 5 is a diagram of a liquid crystal spectrum when a display panel according to some embodiments of the present disclosure displays a white image.

For example, assuming that the first color is blue, the second color is green, and the third color is red. FIG. 5 is a diagram of a liquid crystal spectrum when the display panel displays a white image. In a main band of blue light, a liquid crystal light efficiency of a blue pixel is in a range of 15% to 20%; in a main band of green light, a liquid crystal light efficiency of a green pixel is about 21%; in a main band of red light, a liquid crystal light efficiency of a red pixel is about 21%. That is, the liquid crystal light efficiency of the blue pixel is smaller than the liquid crystal light efficiency of the red pixel, and is also smaller than the liquid crystal light efficiency of the green pixel.

Based on this, both the transmittance of the second color resist 122 and the transmittance of the third color resist 132 may be set to be smaller than the transmittance of the first color resist 112 to compensate for the difference in liquid crystal light efficiency of different pixels.

Here, the embodiments of the present disclosure do not limit a difference between the transmittance of the second color resist 122 and the transmittance of the first color resist 112, and a difference between the transmittance of the third color resist 132 and the transmittance of the first color resist 112, as long as, the difference between the transmittance of the second color resist 122 and the transmittance of the first color resist 112 is used within a reasonable range to compensate for a difference between the liquid crystal light efficiency of the first color pixel 11 and the liquid crystal light efficiency of the second color pixel 12, and the difference between the transmittance of the third color resist 132 and the transmittance of the first color resist 112 is used within a reasonable range to compensate for a difference between the liquid crystal light efficiency of the first color pixel 11 and the liquid crystal light efficiency of the third color pixel 13.

The embodiment of the present disclosure does not limit a manner in which the transmittance of the second color resist 122 and the transmittance of the third color resist 132 are both smaller than the transmittance of the first color resist 112. For example, in a case where a transmittance of a material used for the first color resist 112, a transmittance of a material used for the second color resist 122, and a transmittance of a material used for the third color resist 132 are the same, a thickness of the first color resist 112 may be set to be smaller than a thickness of the second color resist 122, so that the transmittance of the second color resist 122 is smaller than the transmittance of the first color resist 112; and the thickness of the first color resist 112 may be set to be smaller than a thickness of the third color resist 132, so that the transmittance of the third color resist 132 is smaller than the transmittance of the first color resist 112.

Alternatively, in a case where a thickness of the first color resist 112, a thickness of the second color resist 122, and a thickness of the third color resist 132 are the same, a transmittance of a material used for the second color resist 122 may be set to be smaller than a transmittance of a material used for the first color resist 112, so that the transmittance of the second color resist 122 is smaller than the transmittance of the first color resist 112; and a transmittance of a material used for the third color resist 132 is set to be smaller than the transmittance of the material used for the first color resist 112, so that the transmittance of the third color resist 132 is smaller than the transmittance of the first color resist 112.

Certainly, it may be achieved by other means that the transmittance of the second color resist 122 and the transmittance of the third color resist 132 are both smaller than the transmittance of the first color resist 112, which is not limited in the embodiments of the present disclosure.

In some embodiments of the present disclosure, the display panel is, for example, a liquid crystal display panel. Some embodiments of the present disclosure do not limit a display mode of the liquid crystal display panel, as long as liquid crystal in the liquid crystal display panel is deflected by an applied voltage to control an emission of light incident on the liquid crystal display panel to realize the display of the liquid crystal display panel.

For example, the display mode of the liquid crystal display panel may be any one of an Advanced Super Dimension Switch (ADS) type, an In Plane Switch (IPS) type, a Twisted Nematic (TN) type, a Vertical Alignment (VA) type and the like.

Some embodiments of the present disclosure provide a display panel 100. In the display panel 100, the first color pixel 11 has the aforementioned pixel structure of 1P2D, and the second color pixel 12 and the third color pixel 13 form a pixel structure of 2P2D, meanwhile, the second electrode 121 extends in the third direction, the third electrode 131 extends in the fourth direction, and the third direction and the fourth direction are both inclined with respect to the pixel row direction, and the third direction and the fourth direction are mirror-symmetrical to each other with respect to the pixel row direction. Therefore, the color cast problem of the display panel may be avoided. On this basis, in a pixel array including a plurality of pixels, each pixel row and each pixel column includes the first color pixel 11, the second color pixel 12, and the third color pixel 13, therefore, even if the second electrode 121 in the second color pixel 12 extends in the third direction inclined with respect to the pixel row direction, and the third electrode 131 in the third color pixel 13 extends in the fourth direction inclined with respect to the pixel row direction, a phenomenon that the display image exhibits bright and dark horizontal/longitudinal stripes does not occur, which exists in the pixel structure of 2P2D in the prior art. Meanwhile, since the pixel structure of the first color pixel 11 is different from the pixel structure of each of the second color pixel 12 and the third color pixel 13, the liquid crystal light efficiency of the first color pixel 11 is smaller than the liquid crystal light efficiency of the second color pixel 12, and is also smaller than the liquid crystal light efficiency of the third color pixel 13. Therefore, the transmittance of the second color resist 122 and the transmittance of the third color resist 132 may be set to both be smaller than the transmittance of the first color resist 112 to compensate for the difference between the liquid crystal light efficiency of the first color pixel 11 and the liquid crystal light efficiency of the second color pixel 12, and the difference between the liquid crystal light efficiency of the first color pixel 11 and the liquid crystal light efficiency of the third color pixel 13, so that the brightness of light actually emitted from the first color pixel 11 is close to the brightness of light that should theoretically be emitted from the first color pixel 11, thereby avoiding a noticeable bright spot being presented on the image displayed by the display panel.

Optionally, a ratio of the transmittance of the first color resist 112 to the transmittance of the second color resist 122 and a ratio of the transmittance of the first color resist 112 to the transmittance of the third color resist 132 are both greater than 1 and less than or equal to 1/0.95.

For example, the ratio of the transmittance of the first color resist 112 to the transmittance of the second color resist 122, and the ratio of the transmittance of the first color resist 112 to the transmittance of the third color resist 132 are both 1.008, or 1.05, or 1/0.95.

In some embodiments of the present disclosure, a ratio of the liquid crystal light efficiency of the first color pixel 11 to the liquid crystal light efficiency of the second color pixel 12, and a ratio of the liquid crystal light efficiency of the first color pixel 11 to the liquid crystal light efficiency of the third color pixel 13 are both generally greater than or equal to 0.95 and less than 1, therefore, the ratio of the transmittance of the first color resist 112 to the transmittance of the second color resist 122 and the ratio of the transmittance of the first color resist 112 to the transmittances of the third color resists 132 are both greater than 1 and less than or equal to 1/0.95, to compensate for the difference between the liquid crystal light efficiency of the first color pixel 11 and the liquid crystal light efficiency of the second color pixel 12, and the difference between the liquid crystal light efficiency of the first color pixel 11 and the liquid crystal light efficiency of the third color pixel 13.

Optionally, in some embodiments, the thickness of the first color resist 112 is less than the thickness of the second color resist 122, the thickness of the first color resist 112 is less than the thickness of the third color resist 132, and the thickness of the second color resist 122 is equal to the thickness of the third color resist 132.

In some embodiments, the transmittance of the material used for the second color resist 122 is equal to the transmittance of the material used for the third color resist 132.

In the embodiments of the present disclosure, since the liquid crystal light efficiency of the second color pixel 12 is theoretically the same as that of the third color pixel 13, in a case where the transmittance of the material used for the second color resist 122 is equal to the transmittance of the material used for the third color resist 132, the thickness of the second color resist 122 is set to be equal to the thickness of the third color resist 132 to ensure that the brightness of light actually emitted from the second color pixel 12 is the same as the brightness of light which should theoretically be emitted from the second color pixel 12, and to ensuring the brightness of light actually emitted from the third color pixel 13 is the same as the brightness of light which should theoretically be emitted from the third color pixel 13.

In some embodiments, the first direction is parallel to the third direction, and/or the second direction is parallel to the fourth direction, and the first direction and the second direction are mirror-symmetrical to each other with respect to the pixel row direction, and the third direction and the fourth direction are mirror-symmetrical to each other with respect to the pixel row direction.

Considering that the normal display of the display panel may be affected when an included angle between the pixel row direction and each of the first direction, the second direction, the third direction, and the fourth direction is large, therefore, optionally, an acute angle between the pixel row direction and each of the first direction, the second direction, the third direction, and the fourth direction is in a range of 2° to 20°.

Specifically, since a process of making an inclined angle between an inclined direction of a pixel electrode and a horizontal direction at 5° or 7° is in relatively mature, in some embodiments, an acute angle between the pixel row direction and each of the first direction, the second direction, the third direction, and the fourth direction is about 5° or 7°. For example, an acute angle between the pixel row direction and each of the first direction and the second direction is about 5°, and an acute angle between the pixel row direction and each of the third direction and the fourth direction is about 7°. It can be understood that the term "about" here means the deviation may be within 10%.

In some embodiments, the first color pixel 11 is a blue pixel, the second color pixel 12 is a green pixel, and the third color pixel 13 is a red pixel.

In some embodiments of the present disclosure, the most frequently displayed image of the display panel is a white image. To display a white image, a luminance ratio of red, green, and blue is 1:4.5907:0.0601. It can be seen that when a white image is displayed, a brightness of blue is the smallest. Therefore, the first color pixel 11 may be a blue pixel. In this way, even if the liquid crystal light efficiency of the blue pixel is smaller than the liquid crystal light efficiency of the red pixel and the liquid crystal light efficiency of the green pixel, the effect on the displayed white image is small.

Figure 6:
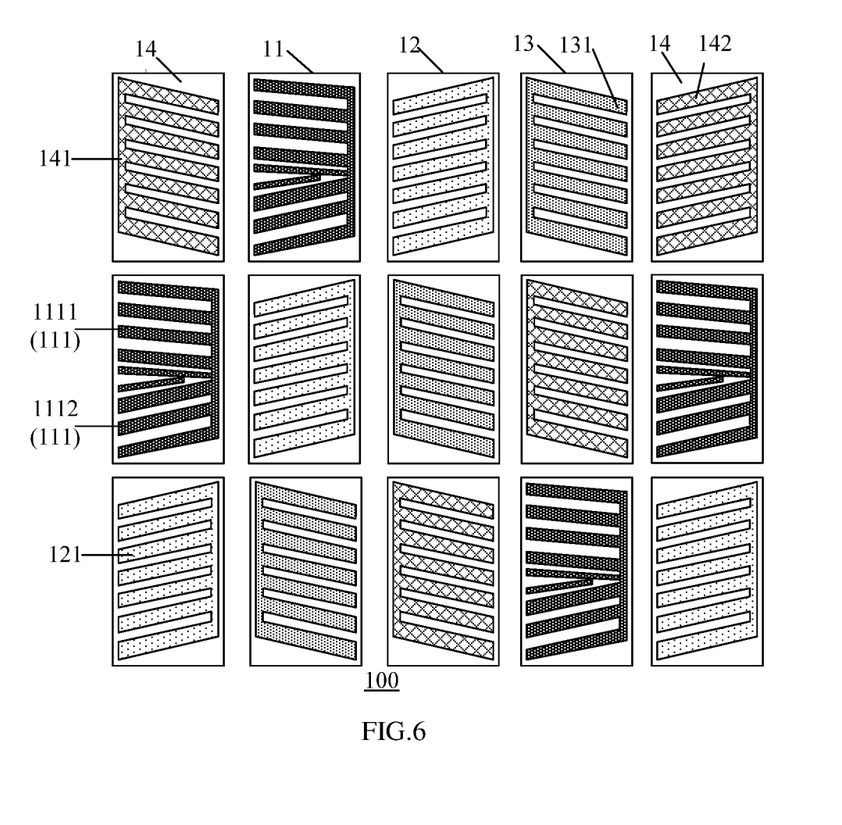
FIG. 6 is a schematic view of a pixel structure according to some embodiments of the present disclosure, in which an electrode of each pixel is mainly shown.

FIG. 6 is a schematic view of a pixel structure according to some embodiments of the present disclosure, in which an electrode of each a pixel is mainly shown. The pixel structure in the embodiments further increases a fourth pixel compared with the pixel structure shown in FIG. 2. As shown in FIG. 6, the display panel 100 includes a plurality of pixels arranged in an array, and each pixel row includes a first color pixel 11, a second color pixel 12, a third color pixel 13, and a fourth color pixel that are sequentially and periodically arranged. The first color, the second color, and the third color are, for example, three primary colors, and the fourth color is, for example, white. In each pixel row, for any two adjacent fourth color pixels, one fourth color pixel 14 includes a fourth electrode 141 which extends in a fifth direction, and the fifth direction is not parallel to the pixel row direction, that is, the fifth direction is inclined with respect to the pixel row direction; the other fourth color pixel 14 includes the fifth electrode 142, which extends in a sixth direction, and the sixth direction is not parallel to the pixel row direction, that is, the six directions is inclined with respect to the pixel row direction. In some embodiments, the fifth direction and the sixth direction may be mirror-symmetrical with respect to the pixel row direction. In some embodiments, the first electrode 111, the second electrode 121, the third electrode 113, the fourth electrode 141, and the fifth electrode 142 all include, for example, strip electrodes, and in any pixel, the plurality of strip electrodes are electrically connected to each other, for example, by a longitudinal electrode parallel to a pixel column direction as shown in FIG. 6.

In some embodiments, the first color pixel 11, the second color pixel 12, and the third color pixel 13 are also sequentially and periodically arranged in each pixel column. For each pixel column, for any two adjacent fourth color pixels, the similar settings described above may also be employed, and are not described herein.

It should be noted that, in each pixel row, the first color pixel 11, the second color pixel 12, and the third color pixel 13 are arranged between any two adjacent fourth pixels 14.

In some embodiments of the present disclosure, in a case where the display panel 100 further includes fourth pixels 14, some of the fourth color pixels 14 include the fourth electrodes 141, and others of the fourth color pixels 14 include the fifth electrodes 142, and the fifth direction in which the four electrodes 141 extend and the sixth direction in which the fifth electrodes 142 extend are mirror-symmetrical to each other with respect to the pixel row direction, therefore, the color cast problem may be avoided, and the bright and dark horizontal/longitudinal stripes of the related art do not occur.

In some embodiments, the fifth direction is parallel to the first direction; and/or the sixth direction is parallel to the second direction.

In some embodiments, the fifth direction is parallel to the third direction and/or the sixth direction is parallel to the fourth direction.

For example, it may include but is not limited to the following cases:

In one case, the fifth direction is parallel to the first direction, and the fifth direction is not parallel to the third direction. At the same time, the sixth direction is parallel to the second direction, and the sixth direction is not parallel to the fourth direction.

In another case, the fifth direction is parallel to the third direction, and the fifth direction is not parallel to the first direction. At the same time, the sixth direction is parallel to the fourth direction, and the sixth direction is not parallel to the second direction.

In another case, the fifth direction, the third direction, and the first direction are all parallel to each other. At the same time, the sixth direction, the fourth direction, and the second direction are all parallel to each other.

Figure 7:
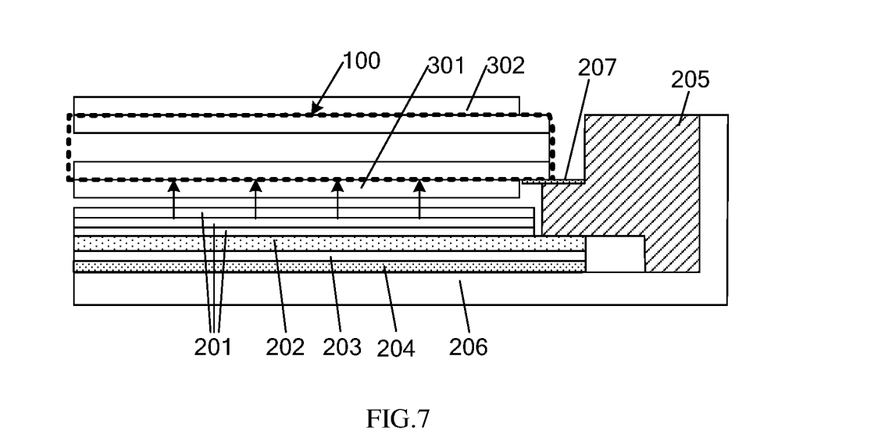
FIG. 7 is a schematic structural view of a display device according to some embodiments of the present disclosure.
Figure 8:
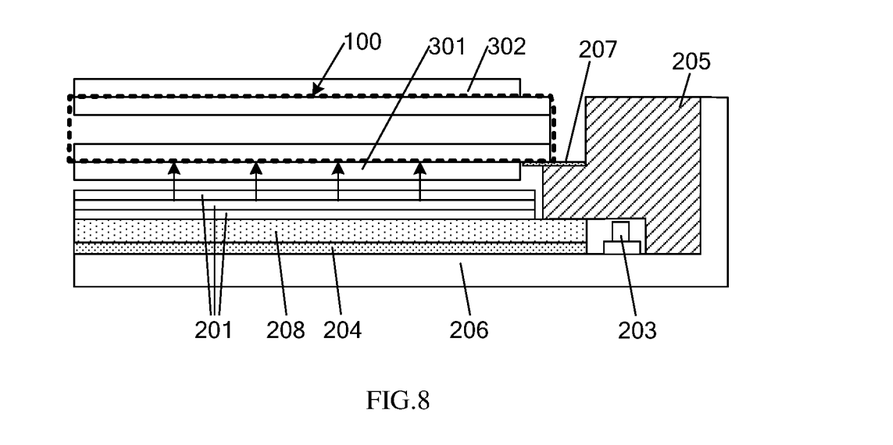
FIG. 8 is a schematic structural view of a display device according to some embodiments of the present disclosure.

Some embodiments of the present disclosure provide a display device, as shown in FIGS. 7 and 8, including the display panel 100 of any of the foregoing embodiments.

In addition, the display device further includes a backlight that provides a light source for the display panel 100, a lower polarizer 301 disposed on a light incident side of the display panel 100, and an upper polarizer 302 disposed on a light exit side of the display panel 100.

The backlight may be a direct type backlight or a side type backlight. The polarizing axes of the upper polarizer 301 and the lower polarizer 302 are perpendicular or parallel to each other.

Specifically, FIG. 7 is a schematic structural view of a display device according to some embodiments of the present disclosure. As shown in FIG. 7, the direct type backlight includes a back plate 206, a rubber frame 205, and a light source 203 disposed on the back plate 206, a diffusion plate 202 disposed on the light source 203 and an optical film 201 disposed on a light exit side of the diffusion plate 202. In addition, the direct type backlight may further include a reflective sheet 204 disposed between the back plate 206 and the light source 203.

FIG. 8 is a schematic structural view of a display device according to some embodiments of the present disclosure. As shown in FIG. 8, the side type backlight includes a back plate 206, a rubber frame 205, a light guide plate 208 disposed on the back plate 206, an optical film 201 disposed on a light exit side of the light guide plate 208 and a light source 203 disposed on a side of the light guide plate 208.

In addition, the side type backlight may further include a reflective sheet 204 disposed between the back plate 206 and the light guide plate 208.

In some embodiments, the display panel 100 and the rubber frame 205 may be secured by a black adhesive tape 207.

It should be noted that the present disclosure does not limit the use of the display device. For example, the display device may be a camera, a television, a computer, a mobile phone, or the like.

In addition, other descriptions of the display device may be referred to the description of the display panel 100, and details are not described herein again.

Some embodiments of the present disclosure provide a display device including the display panel 100. In the display panel 100, the first color pixel 11 has a pixel structure of 1P2D, and the second color pixel 12 and the third color pixel 13 form a pixel structure of 2P2D, meanwhile, the second electrode 121 of the second color pixel 12 extends in the third direction which is inclined with respect to the pixel row direction, and the third electrode 131 of the third color pixel extends in the fourth direction which is inclined with respect to the pixel row direction, and the third direction and the fourth direction are mirror-symmetrical to each other with respect to the pixel row direction. Therefore, the color cast problem of the display panel may be avoided. On this basis, in a pixel array including a plurality of pixels, each pixel row and/or each pixel column includes the first color pixel 11 and the second color pixel 12, and the third color pixel 13, therefore, even if the second electrode 121 in the second color pixel 12 extends in the third direction inclined with respect to the pixel row direction, and the third electrode 131 in the third color pixel 13 extends in the fourth direction inclined with respect to the pixel row direction, a phenomenon that the display image exhibits bright and dark horizontal/longitudinal stripes does not occur, which exists in the pixel structure of 2P2D in the prior art. Meanwhile, since the pixel structure of the first color pixel 11 is different from the pixel structure of each of the second color pixel 12 and the third color pixel 13, the liquid crystal light efficiency of the first color pixel 11 is smaller than the liquid crystal light efficiency of the second color pixel 12, and is also smaller than the liquid crystal light efficiency of the third color pixel 13. Therefore, the transmittance of the second color resist 122 and the transmittance of the third color resist 132 may both be set to be smaller than the transmittance of the first color resist 112 to compensate for the difference between the liquid crystal light efficiency of the first color pixel 11 and the liquid crystal light efficiency of the second color pixel 12, and the difference between the liquid crystal light efficiency of the first color pixel 11 and the liquid crystal light efficiency of the third color pixel 13, so that the brightness of light actually emitted from the first color pixel 11 is close to the brightness of light that should theoretically be emitted from the first color pixel 11, thereby avoiding a noticeable bright spot on the image displayed by the display device.

The above description is only the specific embodiments of the present disclosure. However the scope of the present disclosure is not limited thereto. Any changes or substitutions that may be readily conceived by those skilled in the art within the scope of the present disclosure are intended to be encompassed within the scope of the present disclosure. The scope of protection of the present disclosure shall be subject to the scope of protection of the claims.

What is claimed is:

1. A display panel comprising:
a first color pixel comprising:
a first sub-electrode disposed in a first region of the first color pixel and configured to extend in a first direction; and
a second sub-electrode disposed in a second region of the first color pixel and configured to extend in a second direction,
a second color pixel comprising a second electrode configured to extend in a third direction; and
a third color pixel comprising a third electrode configured to extend in a fourth direction,
wherein:
the first color pixel further comprises a first color resist covering the first sub-electrode and the second sub-electrode;
the second color pixel further comprises a second color resist covering the second electrode;
the third color pixel further comprises a third color resist covering the third electrode;
a transmittance of the second color resist and a transmittance of the third color resist are both smaller than a transmittance of the first color resist,
the first color pixel, the second color pixel and the third color pixel are arranged in an array, and
in an extending direction of a boundary between the first sub-electrode and the second sub-electrode, the first color pixel, the second color pixel, and the third color pixel are sequentially and periodically arranged.

2. The display panel according to claim 1, wherein the first direction and the second direction are mirror-symmetrical to each other with respect to the pixel row direction.

3. The display panel according to claim 1, wherein the third direction and the fourth direction are mirror-symmetrical to each other with respect to the pixel row direction.

4. The display panel according to claim 1, wherein a ratio of each of the transmittance of the second color resist and the transmittance of the third color resist to the transmittance of the first color resist is less than 1 and greater than or equal to 0.95.

5. The display panel according to claim 1, wherein a thickness of the first color resist is smaller than a thickness of the second color resist, and the thickness of the first color resist is smaller than a thickness of the third color resist.

6. The display panel according to claim 5, wherein the thickness of the second color resist is equal to the thickness of the third color resist.

7. The display panel according to claim 1, wherein:
the first direction is parallel to the third direction; and/or
the second direction is parallel to the fourth direction.

8. The display panel according to claim 1, wherein an acute angle between the pixel row direction and each of the first direction, the second direction, the third direction and the fourth direction is in a range of 2° to 20°.

9. The display panel according to claim 8, wherein an acute angle between the pixel row direction and each of the first direction, the second direction, the third direction and the fourth direction is about 5° or 7°.

10. The display panel according to claim 1, wherein the first color pixel is a blue pixel, the second color pixel is a green pixel, and the third color pixel is a red pixel.

11. The display panel according to claim 1, wherein each of the first sub-electrode, the second sub-electrode, the second electrode and the third electrode is a pixel electrode or a common electrode.

12. The display panel according to claim 1 further comprising a fourth color pixel, wherein the first color pixel, the second color pixel, the third color pixel, and the fourth color pixel are arranged in an array, and in a pixel row direction, the first color pixel, the second color pixel, the third color pixel and the fourth color pixel are sequentially and periodically arranged, wherein in each pixel row, a first one of any two adjacent fourth color pixels comprises a fourth electrode extending in a fifth direction, and a second one of the two adjacent fourth color pixels comprises a fifth electrode extending in a sixth direction.

13. The display panel according to claim 12, wherein the fifth direction and the sixth direction are mirror-symmetrical to each other with respect to the pixel row direction.

14. The display panel according to claim 12, wherein:
the fifth direction is parallel to the first direction; and/or
the sixth direction is parallel to the second direction.

15. The display panel according to claim 12, wherein:
the fifth direction is parallel to the third direction; and/or
the sixth direction is parallel to the fourth direction.

16. The display panel according to claim 12, wherein the fourth color pixel is a white pixel.

17. The display panel according to claim 1, wherein the display panel comprises a liquid crystal display panel.

18. A display device comprising the display panel according to claim 1.

* * * * *